(12) United States Patent
Evulet

(10) Patent No.: US 11,505,316 B2
(45) Date of Patent: Nov. 22, 2022

(54) CONFIGURATION FOR VERTICAL TAKE-OFF AND LANDING SYSTEM FOR AERIAL VEHICLES

(71) Applicant: Jetoptera, Inc., Edmonds, WA (US)

(72) Inventor: Andrei Evulet, Edmonds, WA (US)

(73) Assignee: JETOPTERA, INC., Edmonds, WA (US)

( * ) Notice: Subject to any disclaimer, the term of this patent is extended or adjusted under 35 U.S.C. 154(b) by 153 days.

(21) Appl. No.: 16/675,104

(22) Filed: Nov. 5, 2019

(65) Prior Publication Data

US 2020/0339257 A1 Oct. 29, 2020

Related U.S. Application Data

(63) Continuation of application No. 15/456,450, filed on Mar. 10, 2017, now Pat. No. 10,464,668, which is a (Continued)

(51) Int. Cl.
*B64C 29/04* (2006.01)
*B64C 11/00* (2006.01)
(Continued)

(52) U.S. Cl.
CPC .............. *B64C 29/04* (2013.01); *B64C 9/38* (2013.01); *B64C 11/001* (2013.01); *B64C 15/00* (2013.01); *B64C 21/00* (2013.01); *B64C 29/02* (2013.01); *B64C 39/024* (2013.01); *B64C 39/12* (2013.01); *B64D 27/10* (2013.01); *B64D 27/20* (2013.01); *B64D 29/02* (2013.01); *B64D 33/02* (2013.01); *B64D 33/04* (2013.01); *B64C 2201/021* (2013.01); *B64C 2201/048* (2013.01);
(Continued)

(58) Field of Classification Search
CPC ....... B64C 29/04; B64C 11/001; B64C 15/02; B64C 21/00
USPC .................................................. 244/73, 12.3
See application file for complete search history.

(56) References Cited

U.S. PATENT DOCUMENTS 1,890,059 A * 12/1932 Edison ................ B64C 29/0033
244/12.5
2,734,698 A * 2/1956 Straayer .................. B64C 15/02
244/15
(Continued)

FOREIGN PATENT DOCUMENTS

CA 2827210 A1 * 8/2012 ........... B64C 39/068

*Primary Examiner* — Christopher P Ellis
(74) *Attorney, Agent, or Firm* — P G Scott Born; FisherBroyles LLP

(57) ABSTRACT

A vehicle, includes a main body. A fluid generator is coupled to the main body and produces a fluid stream. At least one fore conduit and at least one tail conduit are fluidly coupled to the generator. First and second fore ejectors are fluidly coupled to the fore conduit, coupled to the main body and respectively coupled to a starboard side and port side of the vehicle. The fore ejectors respectively comprise an outlet structure out of which fluid flows. At least one tail ejector is fluidly coupled to the tail conduit. The tail ejector comprises an outlet structure out of which fluid flows. A primary airfoil element is coupled to the tail portion. A surface of the primary airfoil element is located directly downstream of the first and second fore ejectors such that the fluid from the first and second fore ejectors flows over the such surface.

10 Claims, 6 Drawing Sheets

Related U.S. Application Data continuation-in-part of application No. 15/256,178, filed on Sep. 2, 2016, now Pat. No. 10,207,812.

(60) Provisional application No. 62/307,318, filed on Mar. 11, 2016, provisional application No. 62/213,465, filed on Sep. 2, 2015.

(51) Int. Cl.
| | | |
|---|---|---|
| *B64C 15/00* | (2006.01) | |
| *B64C 21/00* | (2006.01) | |
| *B64C 39/12* | (2006.01) | |
| *B64D 27/20* | (2006.01) | |
| *B64C 39/02* | (2006.01) | |
| *B64D 33/02* | (2006.01) | |
| *B64C 29/02* | (2006.01) | |
| *B64D 33/04* | (2006.01) | |
| *B64D 27/10* | (2006.01) | |
| *B64C 9/38* | (2006.01) | |
| *B64D 29/02* | (2006.01) | |

(52) U.S. Cl.
CPC .... *B64C 2201/088* (2013.01); *B64C 2201/10* (2013.01); *B64C 2201/104* (2013.01); *B64C 2201/162* (2013.01); *B64D 2033/0273* (2013.01); *Y02T 50/10* (2013.01); *Y02T 50/40* (2013.01)

(56) References Cited

U.S. PATENT DOCUMENTS

| | | | | |
|---|---|---|---|---|
| 3,097,817 A | * | 7/1963 | Towzey, Jr. | B64C 29/005 244/15 |
| D203,283 S | * | 12/1965 | Woods | D21/448 |
| 3,940,092 A | * | 2/1976 | Farris | B64C 15/02 244/12.5 |
| 4,019,696 A | * | 4/1977 | Hirt | B64C 21/00 244/200.1 |
| 4,236,684 A | * | 12/1980 | Berrier | B64C 15/02 244/12.5 |
| 4,478,378 A | * | 10/1984 | Capuani | B64D 15/02 244/12.5 |
| 4,705,240 A | * | 11/1987 | Dixon | B64C 21/00 244/199.2 |
| RE36,487 E | * | 1/2000 | Wainfan | B64C 3/385 244/34 A |
| 6,845,942 B2 | * | 1/2005 | Paul | B64C 39/026 244/12.2 |
| 8,240,125 B2 | * | 8/2012 | Kawai | B64C 15/02 60/231 |
| 9,132,915 B2 | * | 9/2015 | Zhu | B64C 29/0025 |
| 10,207,812 B2 | * | 2/2019 | Evulet | F02C 6/04 |
| 10,464,668 B2 | * | 11/2019 | Evulet | B64C 21/00 |
| 2008/0016873 A1 | * | 1/2008 | Harefors | F02K 1/002 60/770 |
| 2013/0206921 A1 | * | 8/2013 | Paduano | B64C 13/16 244/7 C |
| 2015/0102155 A1 | * | 4/2015 | Krastev | B60K 16/00 244/2 |
| 2015/0197337 A1 | * | 7/2015 | Tsunekawa | B64C 29/0033 244/23 A |
| 2016/0010589 A1 | * | 1/2016 | Rolt | F01D 13/003 60/226.1 |
| 2017/0008625 A1 | * | 1/2017 | Olm | B64C 3/56 |
| 2017/0283080 A1 | * | 10/2017 | Evulet | B64C 9/38 |
| 2018/0178899 A1 | * | 6/2018 | Har | B64D 27/24 |
| 2018/0305007 A1 | * | 10/2018 | Evulet | B64C 39/12 |
| 2018/0354614 A1 | * | 12/2018 | Tunekawa | B64C 27/20 |
| 2019/0048904 A1 | * | 2/2019 | Neiser | B64C 29/0025 |
| 2019/0202559 A1 | * | 7/2019 | Levy | F04D 27/004 |

* cited by examiner

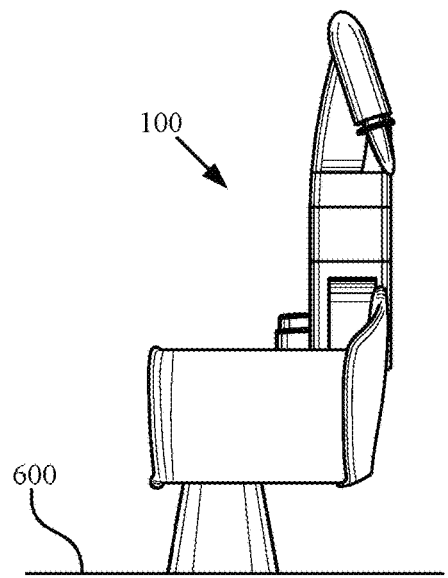
*Fig. 6A*
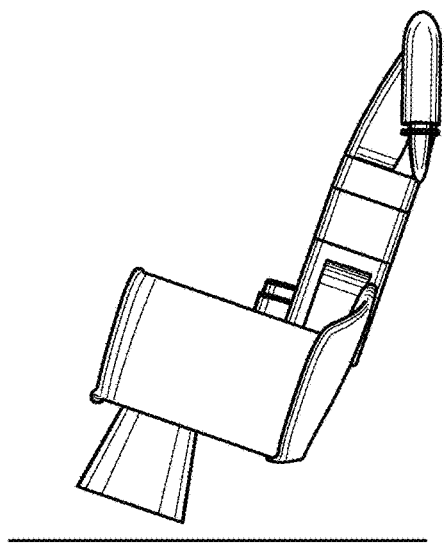
*Fig. 6B*
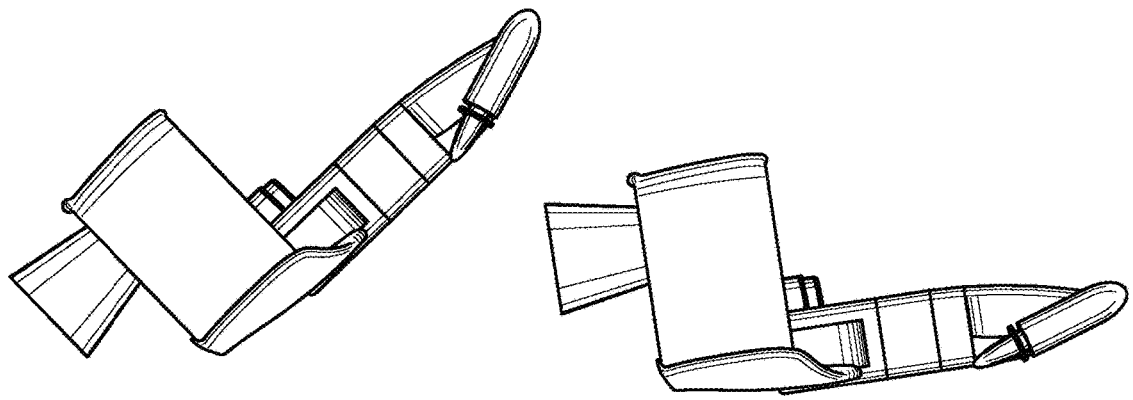
*Fig. 6C*  *Fig. 6D*

US 11,505,316 B2

CONFIGURATION FOR VERTICAL TAKE-OFF AND LANDING SYSTEM FOR AERIAL VEHICLES

PRIORITY CLAIM AND CROSS-REFERENCE TO RELATED APPLICATIONS

This application is a continuation of U.S. application Ser. No. 15/456,450 filed Mar. 10, 2017, issuing as U.S. Pat. No. 10,464,668, which claims priority from U.S. Provisional Appl. No. 62/307,318 filed Mar. 11, 2016. The above-referenced applications are hereby incorporated by reference in their entireties as if fully set forth herein. U.S. application Ser. No. 15/456,450 is also a continuation-in-part of U.S. application Ser. No. 15/256,178 filed Sep. 2, 2016, which claims priority from U.S. Provisional Patent Application 62/213,465, entitled FLUIDIC PROPULSIVE SYSTEM AND THRUST AND LIFT GENERATOR FOR UNMANNED AERIAL VEHICLES, filed Sep. 2, 2015, the contents of each of which are hereby incorporated by reference as if fully set forth herein.

COPYRIGHT NOTICE

This disclosure is protected under United States and/or International Copyright Laws. © 2017-2019 Jetoptera, Inc. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Every VTOL aircraft faces the challenges of sizing of the engine(s) and the balance of forces. See Daniel Raymer, *Aircraft Design: A Conceptual Approach* (*AIAA Education Series*), page 754 (5th ed. 2012).

Vertical take-off can be achieved with a high thrust-to-weight ratio. In contrast, during horizontal flight (cruise), lift forces contribute to the aircraft, and the thrust requirements are much smaller. However, if the intent is to design an aircraft that flies horizontally for a period of time, the VTOL requirement would make the engine requirements too limiting, adding a lot of weight that is then carried around in cruise conditions without functionality. Therefore, the sizing of the engine and thrust matching for a cruise-dominated VTOL aircraft becomes a major issue.

Balance is one of the most important drivers for the design of a VTOL aircraft. During the take-off phase, the thrust has to be distributed around the aircraft, and moments are balanced around the center of mass, in order for the aircraft to remain balanced. The aircraft cannot be balanced if the source of the thrust is in only one location. For example, even when a horizontal aircraft such as the Harrier is balanced in air, the aircraft needs to employ several thrust generating elements in locations specifically chosen in order to cancel out the moments at all times (calculated as force (thrust) x moment arm around the center of the aircraft mass). This is difficult to achieve if the majority of the thrust is located, for instance, in the rear portion of the aircraft (as typically found in a VTOL aircraft).

BRIEF DESCRIPTION OF THE DRAWING FIGURES

Figure 4:
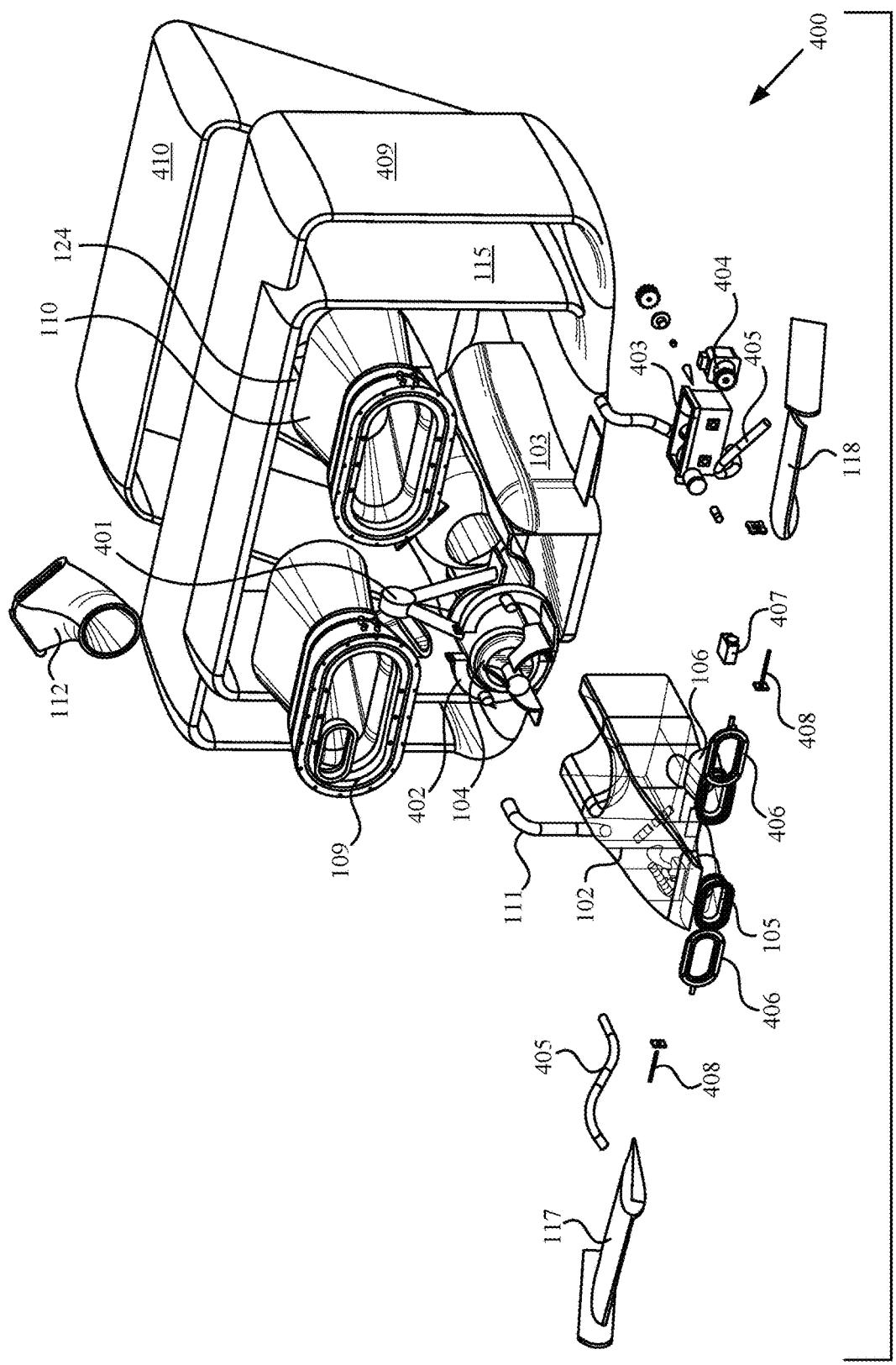
Figure 5:
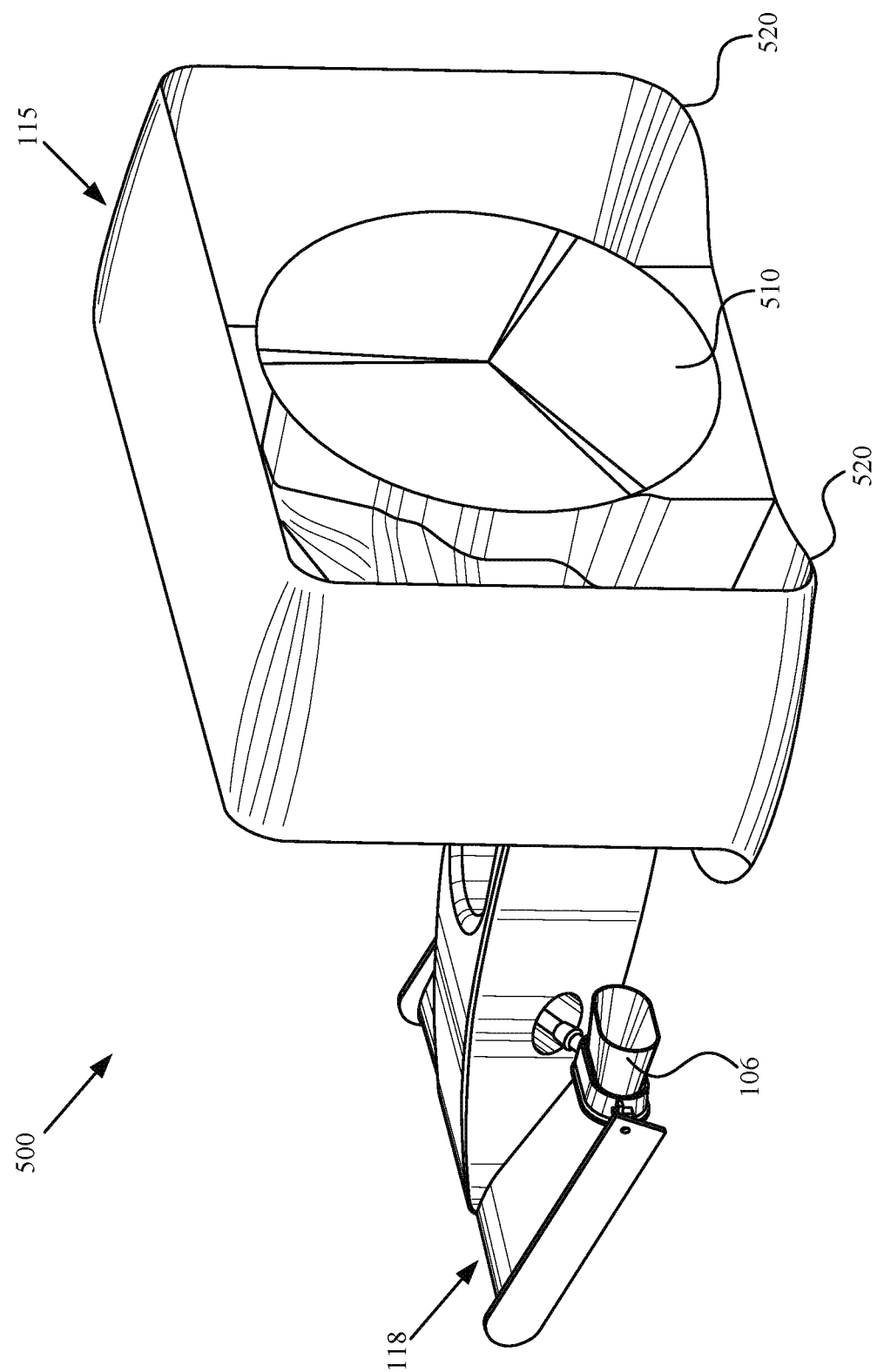
Figure 7:
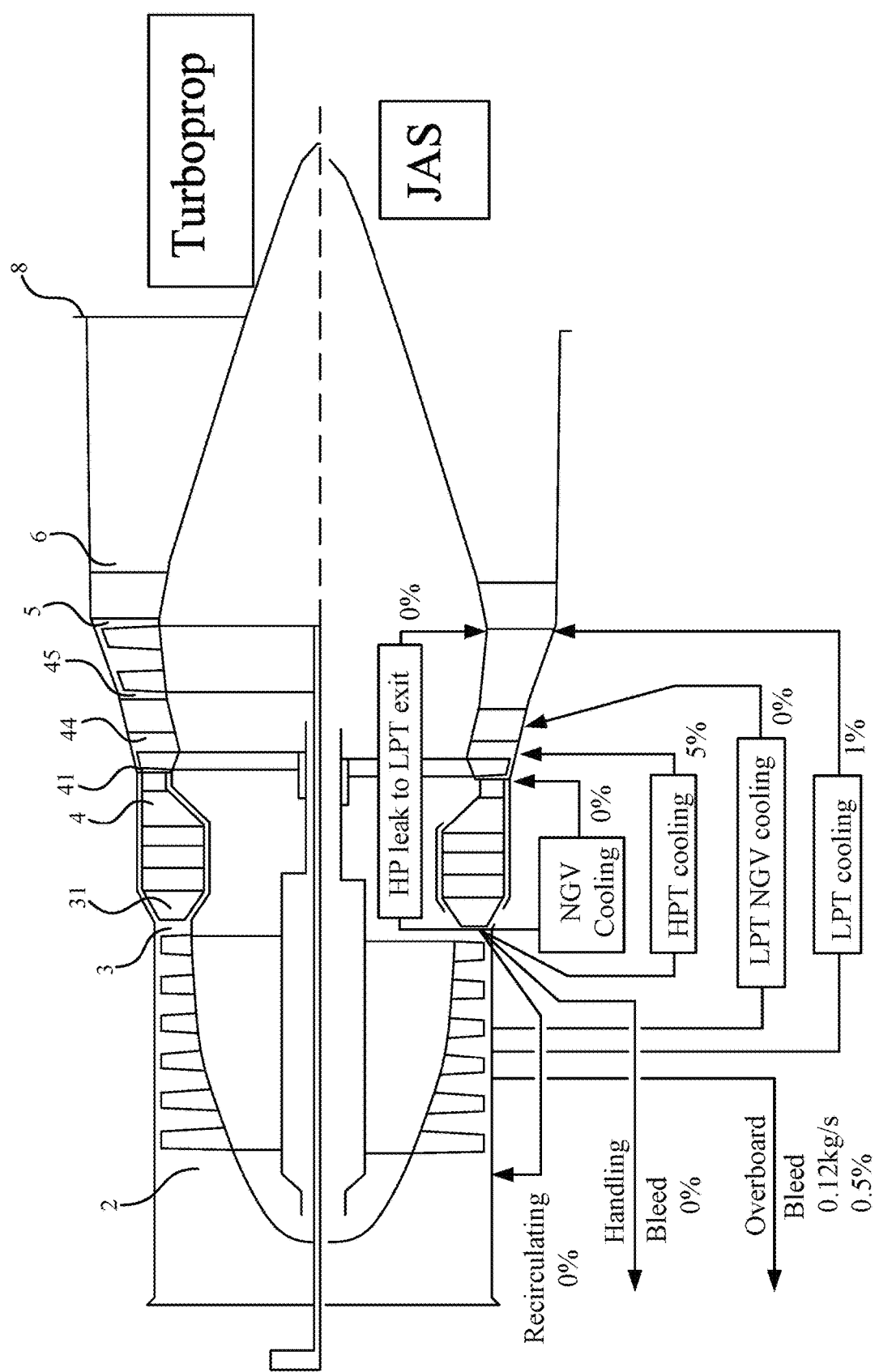

FIG. 4. illustrates an alternative embodiment of the present invention in an exploded isometric view;

FIG. 5 illustrates an alternative embodiment of the present invention in rear perspective view;

FIGS. 6A-D illustrate the progression of an embodiment of the present invention from take-off to level flight relative to a landing/takeoff surface; and FIG. 7 illustrates the upper half of a turboshaft/turboprop engine with highlights of the stations of the flow according to an embodiment of the present invention.

DETAILED DESCRIPTION OF THE PREFERRED EMBODIMENT

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

The present application relates generally to thrust augmentation for unmanned aerial vehicles. In particular, one or more embodiments of the present invention disclosed in this application provide unique solutions to the challenges of vertical take-off and landing (VTOL) and short take-off and landing (STOL) aircrafts. As used herein, the term "Tailsitter" may refer to one or more embodiments of the present invention.

An embodiment of the present invention addresses the issue of thrust-to-weight ratio and sizing of the engine through enhancing and augmenting the thrust. In a preferred embodiment of the present invention, the ejectors/thrusters themselves are designed to allow for augmentation exceeding 2:1 and close to 3:1. This means that these thrusters are designed to produce a thrust that is 2-3 times greater than the thrust produced by a conventional turbojet. Thrust augmentation designs are disclosed in U.S. Provisional Patent Application 62/213,465, entitled FLUIDIC PROPULSIVE SYSTEM AND THRUST AND LIFT GENERATOR FOR UNMANNED AERIAL VEHICLES, filed Sep. 2, 2015 ("the '465 Provisional Application") and U.S. patent application Ser. No. 15/256,178 filed Sep. 2, 2016 ("the '178 Application"). As used herein, "Thrusters" shall refer to such ejectors/thrusters with significant augmentation that are described in the '465 Provisional Application as well as any subsequent versions or improvements thereof.

In a preferred embodiment of the present invention, the Thruster is used with a gas generator as a source for primary flows. While it is not necessary to utilize such a Thruster with a gas generator that supplies the primary flow in the present invention, utilizing such a Thruster can enhance the effects of thrust augmentation.

Further augmentation can be achieved through a secondary, major ejector that can be formed by using the exhaust from the Thrusters in conjunction with, for example, a closed/box wing of the Tailsitter acting as a shroud. The wings may also take any other shape that is designed in such a way to allow the high-speed exhaust of the Thrusters to serve as primary nozzle for the ejector formed by the wing ("shroud") and Thrusters. The effects of the shroud can further augment the thrust by at least 10-25%. In effect, the Thrusters and the shroud can have a combined effect of thrust augmentation of, for example, 1.1 (from shrouded thrusters) times 2.5 (from Thrusters) augmentation, which results in a total augmentation of 2.75. Therefore, such a system can produce a thrust that is equal to the weight of the aircraft at takeoff by augmenting an otherwise ~2.75 thrust generated by a simple turbojet.

In any aircraft which takes off vertically on its tail, the aircraft would naturally need to adjust its attitude to level off at the acceptable attitude and reduce its thrust in order to keep the aircraft flying forward at a constant cruise speed. Thrust reduction via throttle reduction may adjust the power needed to overcome the drag of the aircraft, which may also mean a lesser augmentation of the entire system and sufficient to propel the aircraft forward and maintain its speed.

In one embodiment of the present invention, a 150-lbs aircraft may employ a 75-lbf turbojet adapted to become a gas generator. This concept is disclosed in U.S. Provisional Patent Application 62/263,407, entitled MICRO-TURBINE GAS GENERATOR AND PROPULSIVE SYSTEM, filed Dec. 4, 2015 ("the '407 Provisional Application) and U.S. patent application Ser. No. 15/368,428 filed Dec. 2, 2016 ("the '428 Application"). The '407 Provisional Application and '428 Application are herein incorporated by reference in their entireties. In this embodiment, these thrust augmenting ejectors can produce an augmentation of, for example, 1.75 times the original, which means 75 multiplied by 1.75, which results in 131.25 lbf augmented thrust. Without a shroud around the Thruster, the thrust may be limited to this value and may not allow the thrust to lift the aircraft off the ground. However, with a wing such as a boxed structure around the main Thruster(s) to shroud these Thrusters, the overall augmentation of the thrust becomes, for example, e.g., 1.15 multiplied by 131.25, resulting in 150.94 lbf, and hence exceeds the weight of the aircraft and allows for the take-off.

As the fuel is consumed on board the Tailsitter, the weight of the vehicle becomes lighter and the acceleration of the vehicle becomes larger, so the take-off happens at increasing speed and acceleration. Because the vehicle may not be inhabited, the accelerations may exceed the current human-limited accelerations that are restricted for human safety and non-life threatening standards. In one embodiment, the accelerations may exceed 20 times the gravitational acceleration. As such, after a short time, the vehicle may have the ability to change its attitude and achieve level flight by throttle and control surface changes. Lift increases as the vehicle changes its attitude, while the combined augmentation also diminishes in value due to the throttle pull back. The Tailsitter may then achieve level flight by concomitantly reducing the engine load (ergo gas generator primary stream) to the thrusters in the first level and allowing the boxed wing to produce the proper lift to maintain the attitude, while the thrusters produce enough thrust to overcome drag.

Conversely, on approach to the destination, the attitude of the aircraft can be adjusted with an increase angle of attack and the thrust augmentation again displaces the need for lift, as the forward speed reduces and the aircraft eventually can land vertically, on its tail portion, balanced by the thrusters and its combined augmentation effect.

One or more embodiments of the present invention are able to overcome the issue of balancing the forces and moments by having smaller moment arms than are needed to balance them around the center of mass, which is achieved by having a distribution of thrust across various locations in the aircraft. This, in turn, allows these embodiments to have more control and makes it easier to maintain a hover/upright position.

As discussed in the '465 and '407 Provisional Applications, the unique technology allows for the distribution of thrust across various locations of the aircraft, with augmentation levels achieved in various thrusters (e.g., in front, "fore ejectors" behind canard wings, employed at hovering phases take-off and landing and turned off at level flight, and in the back the "tail ejectors" that generate the bulk of the thrust).

A conventional small (<250 lbf thrust) mini jet engine usually provides thrust at a single location, typically at the center of the exhaust section. Some small turbofans also provide the thrust in a concentrated point on the aircraft. One or more embodiments of the present invention allow the distribution of the thrust in a nearly linear and/or non-circular manner, as opposed to a circular manner, and thus distribute the thrust per the length of a wing or other airfoils and/or control surfaces of an aircraft. In the Tailsitter, both the main, hot stream and the bleed air portion of the stream from the compressor are used as motive fluids for the augmenting thrusters. Because this embodiment allows the distribution of the thrust in a linear, mainly non-circular and distributed, not at a concentrated point, it achieves better propulsive efficiency of the aircraft. In addition, there is the optionally advantageous feature of molding and shaping the thruster according to the shape of the airfoils to obtain better performance (e.g., increasing the stall margin of a given canard wing if thruster is placed downstream of it, or augmenting the lift on a main wing if the thruster is placed at an optimal location upstream of said main wing). The distributed thrust therefore improves the performance of the aircraft by distributing an otherwise 75 lbf turbojet hot and fast stream from a concentrated location at the back of the turbojet engine to, for example, at least four locations on the aircraft. In this example, thrusters are mounted at these four locations on the vehicle in an optimal manner, such that they are (i) receiving the pressurized air or gas stream from the compressor bleed system and exhaust of the gas generator respectively and (ii) augmenting each of the four thrust forces that would otherwise result from the simple isentropic expansion of the four primary streams by 1.5-3 times. This also results in an advantageous distributed flow and thrust from the four locations, thus enhancing the aircraft maneuverability and propulsive efficiency.

An embodiment (a turboprop STOL version) of the present invention includes augmentation of thrust based on motive fluid provided by a bleed system of a gas generator. The bleed system provides the port and starboard front thrusters with the motive air from the bleed. The front thrusters provide an augmentation corresponding to specific thrust of 100-300 lbf for each lb/sec of motive air provided by the bleed system. This value exceeds by far the typical 50-65 lbf/lb/sec specific thrust obtained with small turbojet engines, due to limited efficiencies of the components and lack of advanced technologies. When turned into a gas generator, the value of the compressed air is utilized by employing the thrusters in front and back of the system resulting in augmentation ratios of over 2:1. As such, more thrust can be obtained from the same energy input.

In such an embodiment, a control valve is employed to provide the balance of flow between the port and starboard thrusters. The modulation of the air can be obtained with valves placed between the engine bleed and the control valve box. The valves allow for control of the flow on each thruster and/or balance of the flow of the motive air between the two front thrusters by opening or closing a passage to one or both of the front thrusters and changing the motive fluid supply. This, in turn, generates an imbalance in thrust, and the imbalance results in the change in the aircraft attitude. The thrusters can also be swiveled around their main axis, while being modulated for primary flow (motive fluid flow) at the same time. This allows for control on the pitch and roll as well as some limited control on the yaw, and combinations thereof.

In an embodiment, thrusters are supplied a high pressure hot stream of exhaust gas delivered by the generator (minus the bleed air) via a transition piece or conduit. The transition piece connects the exhaust of the gas generator to the said rear thrusters. Thrusters use this delivery as a motive air to augment the thrust. This jet augmenting system is specifically designed to allow fast movement of the vehicle at the cost of additional fuel consumption, resulting in airspeeds of the vehicle exceeding 200 MPH and propulsive efficiencies of close to 80-90%. The system results in a typical specific fuel consumption of 0.8-1.1 lb/hr of fuel per lbf generated, which is typical of the low by-pass fans, but without a fan or turbine driving the fan. These levels are much more performant than the typical 1.5 lb/hr per lbf usually obtained with small turbojets, the majority of the current markets for drones. The system can also achieve the performance of specific fuel consumption of a low-bypass turbofan at much smaller scale and without employing a free turbine and a fan, per se, reducing thus the weight and complexity of the entire propulsion system and eliminating a large, moving assembly such as the fan/free turbine assembly.

In an embodiment, if the mission of the aircraft is longer duration/range and slower airspeeds at higher propulsive efficiencies, then the rear section of the propulsive system can be made flexible enough to be replaced by a turbine/propeller system while keeping the common, identical gas generator (front of the propulsive system) and augmenting "cold" thrusters. The turbine will receive the same flow as in the case of the jet augmenting system, but can extract the energy from the gas generator exhaust flow and turn it into mechanical work used to rotate the propeller rather than fluidically augment the flow in an ejector type thruster. The interfaces are very similar, the replacement consisting of the removal of the transition piece conduit with a conduit that guides the hot, pressurized gases towards the free turbine driving the propeller, after which the exhaust gases are expelled in the downstream direction and into the wash of the propeller. The advantage of such a flexible system is that with the similar arrangement, a turbopropeller pusher or a jet augmenting system can be interchangeable, allowing the user to choose the system based on the mission at hand. As such, a turbopropeller pusher system as described can achieve a specific fuel consumption level of below 0.6 lb/h per each horsepower or equivalent thrust lbf achieved. In one embodiment of the present invention, the UAV may be able to deliver a parcel as far as 200 miles away moving at an average cruise speed of 150 mph.

Furthermore, the propeller can be perfectly contained by, for example, the box wing system described herein, and thus the noise generated by the turboprop can be significantly reduced by direct (box wing) and indirect means (noise abatement materials inside the wing). In addition, the turboprop still benefits from the presence of the front thrusters and the use of bleed air to power them, allowing not only VTOL but where appropriate and VTOL not necessary, short take-off and landing.

In one or more embodiments of the present invention, the short take-off and landing (STOL) concept can be achieved by the employment of the front thrusters, significantly lowering the runway length required for take-off. By swiveling the thrusters, additional vectored thrust can be oriented to increase pitch during take-off and reduce the length needed as compared to a conventional aircraft. The front thrusters may be shut off during cruise or loitering, or re-activated at various stages of the flight, to augment lift, or thrust or both. The augmentation of the thrust can be accomplished through the very design of the thrusters. The augmentation of the lift can be accomplished by the placement of the front thrusters in relation to both the canard (front wings) and the main box wing. The downstream location of the front thrusters delays stall of the canard wings, allowing operation at higher angles of attack and higher lift coefficients before stall occurs. This is due to the lower pressure created in front of the thrusters, delaying the separation on the top of the wing, the main cause of stall on most wings at high angles of attack. The lift augmentation due to the main wing is mainly due to the increased flow resulting from the front thrusters, locally higher than the airspeed of the vehicle, which said flow is guided over the bottom part of the box wing and, as known to those familiar with the matter, augmenting the lift of the main wing.

Figure 1:
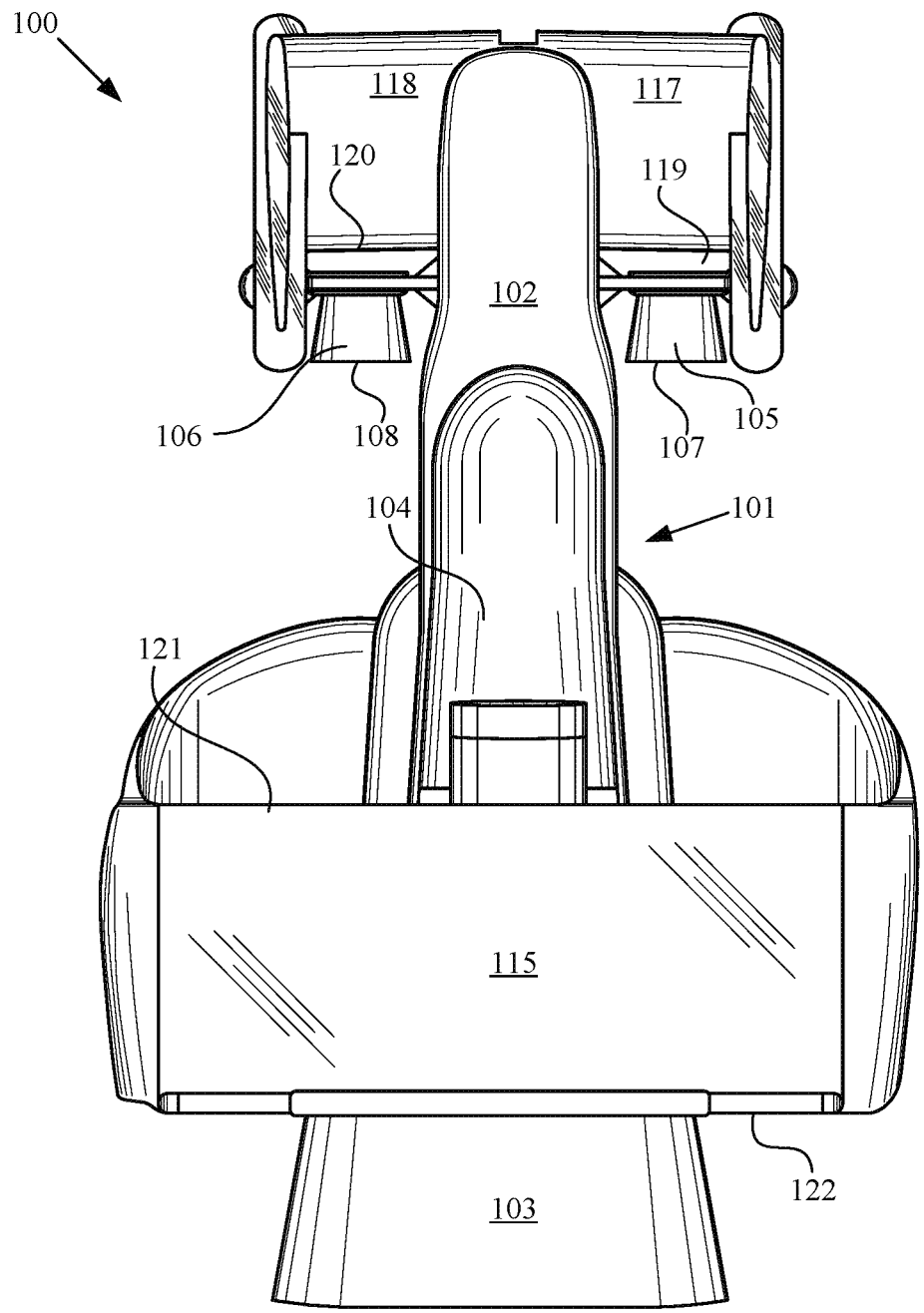
FIG. 1 illustrates a top view of an embodiment of the present invention.
Figure 2:
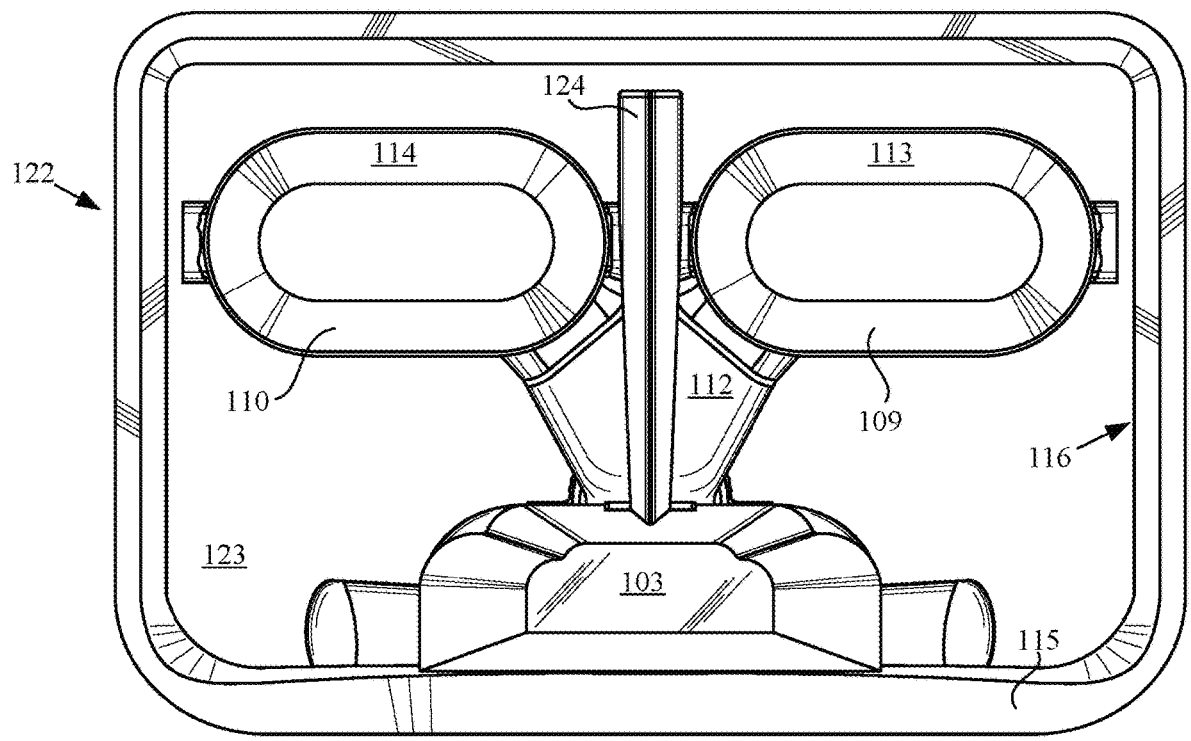
FIG. 2 is a rear view of the embodiment of the present invention shown in FIG. 1.
Figure 3:
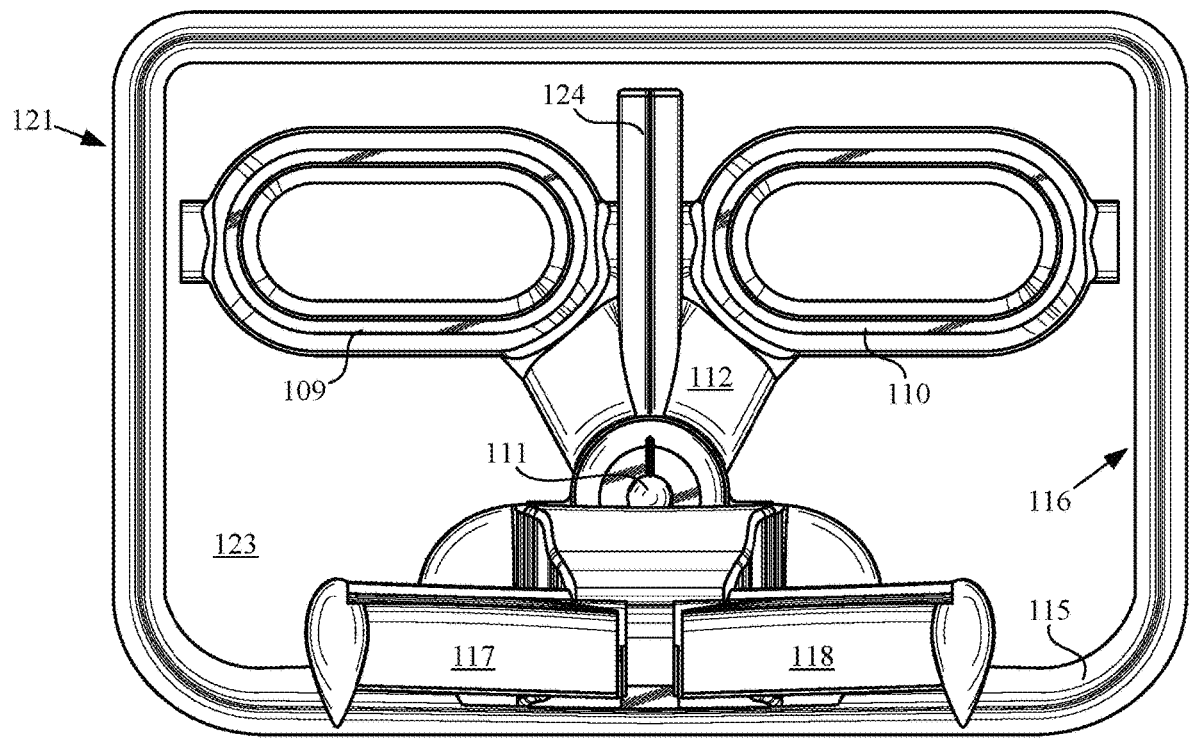
FIG. 3 is a front view of the embodiment of the present invention shown in FIG. 1.

FIGS. 1-3 illustrate a vehicle 100 according to an embodiment of the invention from different perspective views. In FIGS. 1-8, the vehicle 100 has a jet augmenting propulsive system with particular emphasis on VTOL capabilities. More specifically, vehicle 100 includes a main body 101 having a fore portion 102 and a tail portion 103. Main body 101 may include a cockpit portion (not shown) configured to enable manned operation of the vehicle 100. As with all flying/sailing craft, vehicle 100 has a starboard side and a port side. A fluid generator 104 is coupled to the main body 101 and produces a fluid stream. In an embodiment, the fluid generator 104 is disposed in the main body 101. At least one fore conduit (111 in FIG. 3) and at least one tail conduit 112 are fluidly coupled to the generator 104.

First and second fore ejectors 105, 106 are fluidly coupled to the at least one fore conduit 111, coupled to the fore portion 102 and respectively coupled to the starboard side and port side. The fore ejectors 105, 106 respectively include outlet structure 107, 108 out of which fluid from the at least one fore conduit 111 flows at a predetermined adjustable velocity. Additionally, the entirety of each of the fore ejectors 105, 106 is rotatable about an axis oriented parallel to the leading edges of the fore ejectors (i.e., transverse axis) to provide thrust orientation with both forward and upward components, for example, allowing the vehicle 100 to take off and continue climbing at much steeper angles of attack and hence reducing the runway length needed. At the end of the climb or during the climb, the fore ejectors 105, 106 can be realigned to the main direction of flight or shut off completely by turning off the bleed valves of the engine/gas generator 104 and adapting the speed and operation of the gas generator accordingly, driving the rear propulsion system (e.g., tail ejectors 109, 110). After landing, the fore ejectors 105, 106 can be swiveled 180 degrees to provide a thrust reverse against the direction of the landing, shortening the landing length. In an embodiment, the entirety of each of the fore ejectors 105, 106 is rotatable about an axis oriented perpendicular to the leading edges of the fore ejectors.

First and second tail ejectors 109, 110 is fluidly coupled to the at least one tail conduit 112 and coupled to the tail portion 103. The tail ejectors 109, 110 include outlet structure 113, 114 out of which fluid from the at least one tail conduit 112 flows at a predetermined adjustable velocity. Additionally, the entirety of each of the tail ejectors 109, 110 is rotatable about an axis oriented parallel to the leading edges of the tail ejectors (i.e., transverse axis). In an embodiment, the entirety of each of the tail ejectors 109, 110 is rotatable about an axis oriented perpendicular to the leading edges of the tail ejectors.

In an embodiment, the fluid generator 104 includes a first region in which the fluid stream is at a low temperature and a second region in which the fluid stream is at a high temperature. The at least one fore conduit 111 provides fluid from the first region to the fore ejectors 105, 106, and the at least one tail conduit 112 provides fluid from the second region to the tail ejectors 109, 110.

A primary airfoil element 115 is coupled to the tail portion 103. Element 115 is located directly downstream of the fore ejectors 105, 106 such that the fluid from the fore ejectors flows over at least one aerodynamic surface of the primary airfoil element. In an embodiment, the primary airfoil element 115 is a closed wing having a leading edge 121 and a trailing edge 122, the leading and trailing edges of the closed wing defining an interior region 123. Tail ejectors 109, 110 are at least partially disposed within the interior region 123 (i.e., between leading edge 121 and trailing edge 122) and are controllably movable (e.g., advancement, retraction, etc.) within the interior region relative to the airfoil element 115. As such, a shroud is formed by primary airfoil element 115 around the tail ejectors 109, 110, thereby forming a macro-ejector.

The vehicle 100 further includes first and second canard wings 117, 118 coupled to the fore portion 102 and respectively coupled to the starboard side and port side. The canard wings 117, 118 are configured to develop boundary layers of ambient air flowing over the canard wings when the vehicle 100 is in motion. The canard wings 117, 118 are respectively located directly upstream of the fore ejectors 105, 106 such that the fore ejectors are fluidly coupled to the boundary layers. The fore ejectors 105, 106 respectively include inlet portions (i.e., leading edges) 119, 120, and the fore ejectors are positioned such that the boundary layers are ingested by the inlet portions.

FIG. 4 illustrates in exploded view a vehicle 400 according to an alternative embodiment. For the sake of brevity, elements illustrated in FIG. 4 having characteristics identical to their counterparts illustrated in FIGS. 1-3 are denoted using the same reference numeral. Vehicle 400 includes a fluid generator 104, tail ejectors 109, 110, a tail conduit 112 to guide hot pressurized exhaust gas to the tail ejectors, and a rear thruster support strut 401. Vehicle 400 further includes canard wings 117, 118, a bleed air manifold 402 and a fore conduit 111 linking the bleed air manifold to a control valve box 403 having a motor control valve 404 that modulates both fluid flow to fore ejectors 105, 106 and balance of the primary flow supply between the fore ejectors. Flexible lines 405 guide compressed bleed air from control valve box 403 to fore ejectors 105, 106. Each of fore ejectors 105, 106 includes a flange 406 and a motor 407 for swiveling the fore ejectors about shaft 408.

Vehicle 400 further includes primary airfoil element 115 with control surfaces such as rudders, elevons, elevators, etc., an additional closed-wing airfoil element 409, and a secondary closed-wing airfoil element 410. The secondary airfoil element 410 has a leading edge located directly downstream of the outlet structure 113, 114 of tail ejectors 109, 110 such that the fluid from the tail ejectors flow over a surface of the at least one secondary airfoil element. Vehicle 400 further includes a central fin and rudder 124, tail portion 103 carrying tank, fluid generator 104, and controls, and fore portion 102.

FIG. 5 illustrates a vehicle 500 according to an alternative embodiment. For the sake of brevity, elements illustrated in FIG. 5 having characteristics identical to their counterparts illustrated in FIGS. 1-3 are denoted using the same reference numeral. Vehicle 500 includes a turbo-propeller propulsive system with particular emphasis on short take-off and landing (STOL) capabilities. Vehicle 500 includes all of the features of vehicle 100 except for tail ejectors 109, 110. Instead, vehicle 500 includes a propeller 510 driven by a turbine (not shown), which is in turn powered by fluid generator 104. An embodiment can include a support assembly 520, such as legs or other appropriate device, that provide support to vehicle 500 such that there is enough space and/or offset between the propeller 510 and a landing/takeoff surface when the vehicle 500 is at rest. Support assembly 520 preferably extends from the tail portion 103 and is substantially parallel to the main body 101.

FIGS. 6A-D illustrate the progression from take-off to level flight relative to a landing/takeoff surface 600 of vehicle 100. The moveable fore ejectors 105, 106 may be responsible for the fine tuning of the vehicle 100 attitude in-flight up to level flight (cruise). One aspect of this embodiment is that the tail ejectors 109, 110, being larger and employing hot gases as primary fluid, do not necessarily need to swivel to control the attitude, while the fore ejectors 105, 106, being smaller and operating with colder gas from the compressor discharge or bleeds, can be swiveled to maintain the altitude and attitude of the vehicle 100 and drive its orientation in flight to the desired position and attitude. The fore ejectors 105, 106 could then be shut down from a central control valve that closes the bleed port, and/or retracted inside the fore portion 102, allowing the fluid generator 104 to operate at throttle pulled condition (less than 100% speed) and still generate hot gases in the back to supply the tail ejectors 109, 110 with primary fluid, bleed valve closed. An augmentation of 2:1 is still possible in level flight, with minor or no contribution from the boxed wing acting as shroud for the larger or macro-ejector formed by the tail ejectors 109, 110 and airfoil element 115 itself.

The advantageous effect of combining the tail ejectors 109, 110, which produce high-speed airflow, with the primary airfoil element 115 to generate additional thrust augmentation is particularly useful when taking-off in a tailsitter configuration. The tail ejectors 109, 110 become the primary nozzle of a classical ejector. Then the primary airfoil element 115, together with the tail ejectors 109, 110 to form a macro-ejector, generates a thrust augmentation of roughly 1.1-1.2 compared to simple thrusters without the shroud. The tail ejectors 109, 110 themselves can also produce a thrust augmentation of above 2, perhaps close to 3:1. As such, instead of obtaining a unit of thrust by simply using two turbojets, a total thrust augmentation of minimum 2*1.1=2.2 and up to a maximum of 3*1.2=3.6 augmentation factor is obtained, allowing the take-off of a heavier vehicle. As it levels off to cruise conditions, the engines can be throttled back, and the augmentation also decreases to match and overcome drag and propel the vehicle forward in level flight.

FIG. 7 illustrates the upper half a turboshaft/turboprop engine with highlights of the stations of the flow. The bottom half contains the same engine stripped of the shaft and turbine driving the shaft (free turbine driving the propeller, in this case) and using the gas generator to drive a jet augmenting system of the preferred embodiment of the present invention. FIG. 7 shows the changes that would be optionally advantageous for transforming a turboshaft designed engine into a gas generator for the jet augmenting system and highlights the interchangeability of the disclosed system.

In FIG. 7, a puller propeller configuration is shown in the upper half. In contrast, one embodiment of the present invention has the shaft pointing to the right, where the pusher propeller is located. The top half contains a compressor, a combustor and two turbines, one connected to the compressor and one connected to the propeller via a shaft. Station 2 represents a compressor inlet; a compressor outlet station 3; a combustor inlet 31; a combustor outlet 4; a first turbine (connected to and driving the compressor) inlet 41; a first turbine outlet 44; an inlet 45 to the free turbine; an exit 5 from the free turbine, an outlet 6 from the turbine and exhaust; and exhaust (from the overall system) 8. The bleed system from station 3 is used in this embodiment as motive fluid for the front thrusters of the system. The remainder of the working fluid is used by the gas generator to drive the free turbine, which is extracting power to drive the propeller. In the lower half, the system is stripped off the free turbine and the shaft (and implicitly the propeller), but all the other elements remain the same. The system is similar, with the first turbine driving the compressor, except the free turbine is eliminated, allowing the system to become a gas generator that produces at the station 44 a pressure a total pressure of 202.514 kiloPascals at a total temperature of 1248.65 Kelvin. This energy carrying flow can now be used as motive fluid for the tail ejectors 109, 110 of the jet augmenting system of the preferred embodiment of the present invention.

Other gas generators can be designed to produce, at normal operating conditions, a pressure ratio of around 2. An embodiment of the present invention can result in augmentation ratios exceeding 1.5 and various designs of the thrusters can reach up to and including 2.75:1 augmentation ratio. As such, a jet augmenting system of this embodiment operating in these conditions can increase the thrust by 1.4-3 times. Conversely, the specific fuel consumption is reduced as the same amount of fuel is used to produce the conditions at station 44, and 1.4 times more thrust is obtained from the exhaust gas at that condition, used as motive fluid in the rear and front thrusters. When compared to the fuel consumption of conventional small turbojets, typically at 1.5 lb/hr per lbf, the specific fuel consumption with the disclosed jet augmenting system is lowered by 1.4 times, to around 1.07 lb/hr fuel per each lbf produced. One or more embodiments show a reduction of up to 2.0 times compared to the original 1.5 lb/hr of fuel per lbf produced, bringing the system to a highly performant 0.75 lb/hr fuel per each lbf thrust produced, without the use of a free turbine.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The embodiments of the invention in which an exclusive property or privilege is claimed are defined as follows:

1. A vehicle, comprising:
   a main body having a fore portion, a tail portion, a starboard side and a port side;
   at least one propulsion device coupled to the tail portion, the at least one propulsion device comprising an outlet structure out of which fluid from the at least one propulsion device flows at a predetermined adjustable velocity, and
   a primary airfoil element comprising a closed wing having a leading edge and a trailing edge, leading and trailing edges of the closed wing defining an interior region, the at least one propulsion device being at least partially disposed within the interior region.

2. The vehicle of claim 1, further comprising;
   first and second fore ejectors; and
   first and second canard wings coupled to the fore portion and respectively coupled to the starboard side and port side, the canard wings configured to develop boundary layers of ambient air flowing over the canard wings when the vehicle is in motion, the canard wings being respectively located directly upstream of the first and second fore ejectors such that the first and second fore ejectors are fluidly coupled to the boundary layers.

3. The vehicle of claim 2, wherein the first and second fore ejectors respectively comprise first and second inlet portions, and the first and second fore ejectors are positioned such that the boundary layers are ingested by the inlet portions.

4. The vehicle of claim 2, wherein the first and second fore ejectors each have a leading edge, and the entirety of each of the first and second fore ejectors is rotatable about an axis oriented parallel to the leading edge.

5. The vehicle of claim 1, further comprising at least one secondary airfoil element having a surface and coupled to the main body, the leading edge of the at least one secondary airfoil element located directly downstream of the outlet structure.

6. The vehicle of claim 1, wherein the closed wing further comprises a plurality of control surfaces.

7. The vehicle of claim 1, wherein the outlet structure is entirely disposed within the interior region.

8. The vehicle of claim 1, wherein the at least one propulsion device comprises a turbojet.

9. The vehicle of claim 1, further comprising a support assembly extending from the tail portion and parallel to the main body.

10. The vehicle of claim 1, wherein the outlet structure is disposed in the center of the interior region.

\* \* \* \* \*